United States Patent
Zheng et al.

(10) Patent No.: US 11,814,973 B2
(45) Date of Patent: Nov. 14, 2023

(54) METHODS AND APPARATUS TO PROVIDE DAMPING OF AN AIRFOIL

(71) Applicant: General Electric Company, Schenectady, NY (US)

(72) Inventors: Li Zheng, Niskayuna, NY (US); Changjie Sun, Clifton Park, NY (US); Nicholas J. Kray, Evendale, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/568,555

(22) Filed: Jan. 4, 2022

(65) Prior Publication Data
US 2023/0212957 A1  Jul. 6, 2023

(51) Int. Cl.
| | | |
|---|---|---|
| *F01D 25/06* | (2006.01) | |
| *F01D 9/04* | (2006.01) | |
| *F01D 5/18* | (2006.01) | |
| *F01D 25/02* | (2006.01) | |
| *F01D 5/04* | (2006.01) | |

(52) U.S. Cl.
CPC .............. *F01D 25/06* (2013.01); *F01D 5/18* (2013.01); *F01D 9/041* (2013.01); *F01D 25/02* (2013.01); *F01D 5/046* (2013.01); *F05D 2220/32* (2013.01); *F05D 2240/12* (2013.01); *F05D 2260/96* (2013.01)

(58) Field of Classification Search
CPC . F01D 25/06; F01D 5/18; F01D 9/041; F01D 25/02; F01D 5/046
See application file for complete search history.

(56) References Cited

U.S. PATENT DOCUMENTS

| | | | |
|---|---|---|---|
| 5,123,813 A | 6/1992 | Przytulski et al. | |
| 6,371,725 B1 * | 4/2002 | Manteiga | F02K 3/06 415/209.4 |
| 7,866,377 B2 * | 1/2011 | Slaughter | F28F 7/02 700/120 |
| 8,241,004 B2 | 8/2012 | Strother | |
| 9,470,095 B2 | 10/2016 | Propheter-Hinckley et al. | |
| 10,400,625 B2 * | 9/2019 | Cortequisse | F01D 5/147 |
| 10,550,701 B2 * | 2/2020 | Kiener | F01D 5/186 |
| 10,662,781 B2 * | 5/2020 | Mongillo | F01D 5/18 |
| 11,454,171 B1 * | 9/2022 | Rutledge | F02C 6/08 |
| 2009/0304517 A1 * | 12/2009 | Strother | F01D 5/282 416/223 A |
| 2010/0236215 A1 * | 9/2010 | Venkataramani | F01D 9/065 60/39.093 |

(Continued)

FOREIGN PATENT DOCUMENTS

| | | |
|---|---|---|
| EP | 3461994 | 4/2019 |
| EP | 2971536 | 10/2020 |

(Continued)

*Primary Examiner* — Brian Christopher Delrue
(74) *Attorney, Agent, or Firm* — HANLEY, FLIGHT & ZIMMERMAN, LLC

(57) ABSTRACT

Methods, apparatus, systems, and articles of manufacture to provide damping of an airfoil are disclosed. An example airfoil is disposed in a flow path, the airfoil including a shell defining an exterior surface of the airfoil and forming a cavity in an interior surface of the airfoil, and a lattice damper disposed in the cavity, the lattice damper to reduce vibrational loads exerted on the airfoil.

13 Claims, 7 Drawing Sheets

(56) References Cited

U.S. PATENT DOCUMENTS

| | | | |
|---|---|---|---|
| 2011/0262695 A1* | 10/2011 | Lee | F01D 5/182 428/131 |
| 2015/0345327 A1* | 12/2015 | Huang | F01D 25/02 415/115 |
| 2017/0175628 A1* | 6/2017 | Subramanian | F04D 29/584 |

FOREIGN PATENT DOCUMENTS

| | | | |
|---|---|---|---|
| GB | 2397855 | 8/2004 | |
| WO | 2018211270 | 11/2018 | |
| WO | 2020122886 | 6/2020 | |
| WO | WO-2020122886 A1 * | 6/2020 | F01D 5/16 |

* cited by examiner

METHODS AND APPARATUS TO PROVIDE DAMPING OF AN AIRFOIL

FIELD OF THE DISCLOSURE

This disclosure relates generally to turbines and, more particularly, to methods and apparatus to provide damping of an airfoil.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

Figure 1:
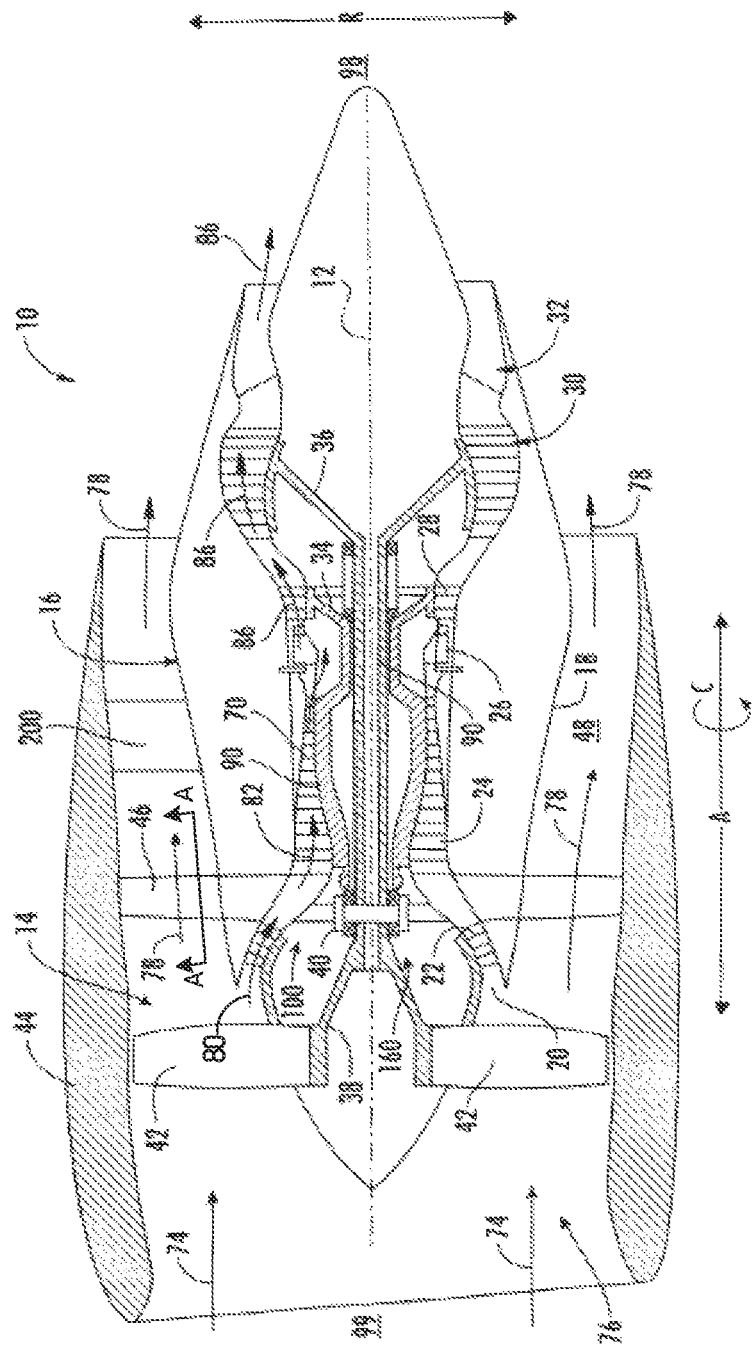
FIG. 1 is a cross-sectional view of an example turbofan gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine. As used herein, "lateral" refers to the direction perpendicular to the axial and vertical directions (e.g., into and out of the plane of FIGS. 1 and/or 2, etc.).

In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, etc.).

As used herein, the terms "axial" and "longitudinal" both refer to a direction parallel to the centerline axis of a gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

The basic operation of a gas turbine implemented in connection with a turbofan engine of a propulsion system of an aircraft includes an intake of fresh atmospheric air flow through the front of the turbofan engine with a fan. In the operation of a turbofan engine, a first portion of the intake air bypasses a core gas turbine engine of the turbofan to produce thrust directly. A second portion of the intake air travels through a booster compressor (e.g., a first compressor) located between the fan and a high-pressure compressor (e.g., a second compressor) in the core gas turbine engine (e.g., the gas turbine). The booster compressor is used to raise or boost the pressure of the second portion of the intake air prior to the air flow entering the high-pressure compressor. The air flow can then travel through the high-pressure compressor that further pressurizes the air flow. The booster compressor and the high-pressure compressor each include a group of blades attached to a rotor and/or shaft. The blades spin at high speed relative to stationary vanes and each rotation of the blades subsequently compresses the air flow. The high-pressure compressor then feeds the pressurized air flow to a combustion chamber (e.g., combustor). In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow. A secondary use of the compressors, particularly the high-pressure compressor, is to bleed air for use in other systems of the aircraft (e.g., cabin pressure, heating, and air conditioning, etc.).

In the combustion chamber of the core gas turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. The turbine can include a low-pressure turbine and a high-pressure turbine, for example. Each of the low-pressure turbine and the high-pressure turbine includes an intricate array of alternating rotating blades and stationary airfoil-section blades (e.g., vanes). The high-pressure turbine is located axially downstream from the combustor and axially upstream from the low-pressure turbine. As the hot combustion gas passes through the turbine, the hot combustion gas expands through the blades and/or vanes, causing the rotating blades coupled to rotors of the high-pressure turbine and the low-pressure turbine to spin.

The rotating blades of the high-pressure turbine and the low-pressure turbine serve at least two purposes. A first purpose of the rotating blades is to drive the fan, the high-pressure compressor, and/or the booster compressor to draw more pressured air into the combustion chamber. For example, in a dual-spool design of a turbofan, the low-pressure turbine (e.g., a first turbine) can be attached to and in force-transmitting connection with the booster compressor (e.g., the first compressor) and fan via a first shaft, collectively referred to as a first spool of the gas turbine, such that the rotation of a rotor of the low-pressure turbine drives a rotor of the booster compressor and the fan. For example, a high-pressure turbine (e.g., a second turbine) can be attached to and in force transmitting connection with the high-pressure compressor (e.g., a second compressor) via a second shaft coaxial with the first shaft, collectively referred to as a second spool of the gas turbine, such that the rotation of a rotor of the high-pressure turbine drives a rotor of the high-pressure compressor. A second purpose of the rotating blades is to spin a generator operatively coupled to the turbine section to produce electricity. For example, the turbine can generate electricity to be used by an aircraft, a power station, etc.

It is generally an object of the design of aircraft engines such as turbofans to compress as much air as is feasible within the compressor of the core gas turbine engine given the static, dynamic, centrifugal and/or thermal stress limitations and weight considerations of aspects of the core gas turbine engine and/or the turbofan engine. A metric defining the compressive action of a compressor is a compression ratio (e.g., pressure ratio) of a compressor. The compression ratio of a compressor of a turbofan engine is the ratio of pressure at an outlet of the compressor (e.g., the outlet of the high-pressure compressor at the combustion chamber of the gas turbine) to pressure at an inlet of a fan. A higher compression ratio increases a thermal efficiency of the turbine engine and decreases a specific fuel consumption of the turbine engine (e.g., a ratio of air to fuel used to create thrust produced by the jet engine). Thus, an increase in the compression ratio of the compressor of a gas turbine can increase thrust produced by a jet engine, such as a turbofan, etc., and/or can increase fuel efficiency of the jet engine. In turn, it is an object of gas turbine design to minimize or otherwise reduce pressure losses through the compressors to maximize or otherwise improve the compression ratio. Though examples disclosed herein are discussed in connection with a turbofan jet engine, it is understood that examples disclosed herein can be implemented in connection with a turbojet jet engine, a turboprop jet engine, a combustion turbine for power production, or any other suitable application where it is desired to increase compression ratios across one or more compressors.

The example low-pressure compressor and high-pressure compressor of the turbine engine of the turbofan each include one or more stages. Each stage includes an annular array of compressor blades (e.g., first airfoils) mounted about a central rotor paired with an annular array of stationary compressor vanes (e.g., second airfoils) spaced apart from the rotor and fixed to a casing of the compressor. At an aft portion of a compressor stage, rotation of the rotor and accompanying blades provides an increase in velocity, temperature, and pressure of air flow. At a fore portion of the compressor stage, the air flow diffuses (e.g., loses velocity) across compressor vanes providing for an increase in pressure. The implementation of multiple stages across the low-pressure compressor and high-pressure compressor provides for the compression ratios to operate a jet engine such as a turbofan.

In the example of the high-pressure compressor and the low-pressure compressor, compressor blades (also referred to herein as blades and/or dovetail blades) are arrayed about a corresponding high-pressure compressor rotor and low-pressure compressor rotor, respectively. The high-pressure rotor and accompanying compressor blades (e.g., blades, dovetail blades, etc.) can be fashioned from titanium alloys (e.g., a titanium-aluminum alloy, a titanium-chromium alloy, etc.) and/or steel alloys (e.g., a steel-chromium alloy), etc. For example, to increase ease of maintenance and assembly, replaceability of blades, and/or modularity of the high-pressure compressor, discrete compressor blades are mounted in series annularly about the high-pressure rotor to achieve a substantially uniform distribution annularly about the rotor. For this purpose, an example compressor blade implemented in accordance with the teachings of this disclosure includes an airfoil portion and a mounting portion (e.g., a root). The airfoil portion of the compressor blade causes the velocity, pressure, and temperature increase to the air flow. The mounting portion of the compressor blade enables mounting of blade to the rotor. In some examples, the geometry of the airfoil portion and/or mounting portion can be different for the compressor blades of each stage of the high-pressure compressor and the same for the compressor blades within each stage of the high-pressure compressor.

In some propeller or open-rotor engine applications, a high vibratory load is experienced during various phases of the flight due to asymmetric propeller loading (e.g., P-Factor or 1P loading). 1P loading, also referred to as +/−1P loading, is typically highest at takeoff, but also may occur at any point at which the airflow is not oriented normal to the engine. Certain examples address +/−1P loading by applying a radial preload to the blade assembly that provides better blade retention and allows for better serviceability. In some cases, the vibratory loads experienced by an airfoil during operation of the engine may result in deflection of the airfoil. Such deflection produces a moment on the root of the blade and, in some cases, may result in wear and/or failure of the blade. In some cases, when there is failure of a blade, a complex disassembly process is completed to remove the blade, which increases the time and work required to service the equipment.

Examples disclosed herein dampen vibrational loads applied to an airfoil during operation of a gas turbine engine. In examples disclosed herein, an example outlet guide vane includes an example cavity formed in an example shell, where the shell defines an exterior surface of the outlet guide vane. An example lattice damper is disposed in the cavity. In some examples, the lattice damper is formed using a plurality of unit cells, where the unit cells can be cross-cubed shaped, diamond shaped, and/or honeycomb shaped. In some examples, during operation of the gas turbine engine, the lattice damper can elastically deform to absorb loads applied to the outlet guide vane, thus reducing damage to the outlet guide vane. In some examples, the outlet guide vane includes an inlet opening and an outlet opening disposed in the shell. In some examples, heated fluid from a core engine of the gas turbine engine can enter the cavity via the inlet opening. In such examples, the heated fluid can circulate throughout the cavity and flow to the outlet opening via one or more channels formed in the lattice damper. Advantageously, the circulation of heated fluid in the cavity reduces and/or prevents formation of ice on the exterior surface of the outlet guide vane, thus reducing damage to the outlet guide vane. Furthermore, by forming the cavity in the outlet guide vane, a weight of the outlet guide vane and/or material costs associated therewith can be reduced.

FIG. 1 is a cross-sectional view of a turbofan gas turbine engine in which examples disclosed herein may be implemented. Referring now to the drawings, FIG. 1 is a schematic partially cross-sectioned side view of an exemplary gas turbine engine 10 as may incorporate various examples of the present disclosure. The engine 10 may particularly be configured as a gas turbine engine for an aircraft. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14. For reference, the engine 10 defines an axial direction A, a radial direction R, and a circumferential direction C. In general, the axial direction A extends parallel to the axial centerline axis 12, the radial direction R extends outward from and inward to the axial centerline axis 12 in a direction orthogonal to the axial direction A, and the circumferential direction extends three hundred sixty degrees (360°) around the axial centerline axis 12.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a heat addition system 26, an expansion section or turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In certain examples, as shown in FIG. 1, the LP rotor shaft 36 is connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes (OGVs) or struts 46. Moreover, at least a portion of the nacelle 44 may extend over an outer portion of the core engine 16 so as to define a fan flow passage 48 therebetween. However, it should be appreciated that various configurations of the engine 10 may omit the nacelle 44, or omit the nacelle 44 from extending around the fan blades 42, such as to provide an open rotor or propfan configuration of the engine 10 depicted in FIG. 2.

It should be appreciated that combinations of the shafts 34, 36, the compressors 22, 24, and the turbines 28, 30 define a rotor assembly 90 of the engine 10. For example, the HP rotor shaft 34, HP compressor 24, and HP turbine 28 may define a high speed or HP rotor assembly of the engine 10. Similarly, combinations of the LP rotor shaft 36, LP compressor 22, and LP turbine 30 may define a low speed or LP rotor assembly of the engine 10. Various examples of the engine 10 may further include the fan shaft 38 and fan blades 42 as the LP rotor assembly. In certain examples, the engine 10 may further define a fan rotor assembly that is at least partially mechanically de-coupled from the LP spool via the fan shaft 38 and the reduction gear 40. Still further examples may further define one or more intermediate rotor assemblies (not shown) defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrow 80, enters the core engine 16 through the annular inlet 20 defined at least partially via the outer casing 18. The flow of air is provided in serial flow through the compressors 22, 24, the heat addition system 26, and the expansion section via a core flow path 70. The flow of air 80 is increasingly compressed as it flows across successive stages of the compressors 22, 24, such as shown schematically by arrows 82. The compressed air 82 enters the heat addition system 26 and mixes with a liquid and/or gaseous fuel and is ignited to produce combustion gases 86. It should be appreciated that the heat addition system 26 may form any appropriate system for generating combustion gases, including, but not limited to, deflagrative or detonative combustion systems, or combinations thereof. The heat addition system 26 may include annular, can, can-annular, trapped vortex, involute or scroll, rich burn, lean burn, rotating detonation, or pulse detonation configurations, or combinations thereof.

The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1 depicts and describes a two-stream engine having the fan flow passage 48 and the core flow path 70. The example depicted in FIG. 1 has a nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

Figure 2:
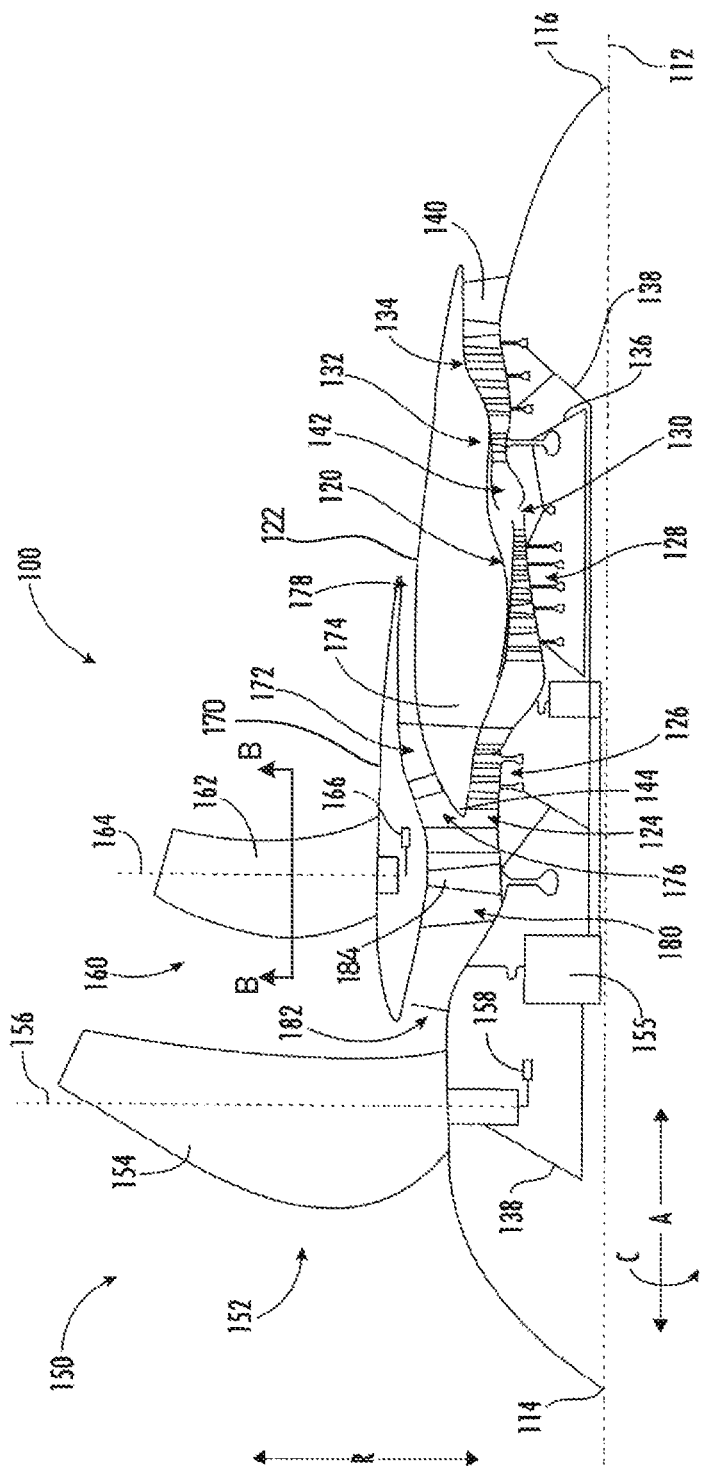
FIG. 2 is a cross-sectional view of an example open rotor engine in which examples disclosed herein may be implemented.

FIG. 2 is a schematic cross-sectional view of an example open-rotor turbine engine according to one example of the present disclosure. Particularly, FIG. 2 illustrates an aviation three-stream turbofan engine herein referred to as "three-stream engine 100". The three-stream engine 100 of FIG. 2 can be mounted to an aerial vehicle, such as a fixed-wing aircraft, and can produce thrust for propulsion of the aerial vehicle. The architecture of the three-stream engine 100 provides three distinct streams of thrust-producing airflow during operation. Unlike the engine 10 shown in FIG. 1, the three-stream engine 100 includes a fan that is not ducted by a nacelle or cowl, such that it may be referred to herein as an "unducted fan," or the entire engine 100 may be referred to as an "unducted engine."

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 2, the core engine 120 includes a core cowl 122 that defines an annular core inlet 124. The core cowl 122 further encloses a low pressure system and a high pressure system. In certain examples, the core cowl 122 may enclose and support a booster or low pressure ("LP") compressor 126 for pressurizing the air that enters the core engine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example. After driving each of the turbines 132, 134, the combustion products exit the core engine 120 through a core exhaust nozzle 140 to produce propulsive thrust. Accordingly, the core engine 120 defines a core flow path or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example. For the depicted example of FIG. 2, the fan 152 is an open rotor or unducted fan. However, in other examples, the fan 152 may be ducted, e.g., by a fan casing or nacelle circumferentially surrounding the fan 152. As depicted, the fan 152 includes an array of fan blades 154 (only one shown in FIG. 2). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. Optionally, as shown in FIG. 2, the fan 152 can be coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this example, each blade 154 of the fan 152 is rotatable about its respective central blade axis 156, e.g., in unison with one another. One or more actuators 158 can be controlled to pitch the blades 154 about their respective central blade axis 156. However, in other examples, each blade 154 may be fixed or unable to be pitched about its central blade axis 156.

The fan section 150 further includes a fan outlet guide vane array 160 that includes fan outlet guide vanes 162 (only one shown in FIG. 2) disposed around the longitudinal axis 112. For this example, the fan outlet guide vanes 162 are not rotatable about the longitudinal axis 112. Each fan outlet guide vane 162 has a root and a tip and a span defined therebetween. The fan outlet guide vanes 162 may be unshrouded as shown in FIG. 2 or may be shrouded, e.g., by an annular shroud spaced outward from the tips of the fan outlet guide vanes 162 along the radial direction R. Each fan outlet guide vane 162 defines a central blade axis 164. For this example, each fan outlet guide vane 162 of the fan outlet guide vane array 160 is rotatable about its respective central blade axis 164, e.g., in unison with one another. One or more actuators 166 can be controlled to pitch the fan outlet guide vane 162 about their respective central blade axis 164. However, in other examples, each fan outlet guide vane 162 may be fixed or unable to be pitched about its central blade axis 164. The fan outlet guide vanes 162 are mounted to a fan cowl 170.

As shown in FIG. 2, in addition to the fan 152, which is unducted, a ducted fan 184 is included aft of the fan 152, such that the three-stream engine 100 includes both a ducted and an unducted fan that both serve to generate thrust through the movement of air without passage through core engine 120. The ducted fan 184 is shown at about the same axial location as the fan outlet guide vane 162, and radially inward of the fan outlet guide vane 162. Alternatively, the ducted fan 184 may be between the fan outlet guide vane 162 and core duct 142, or be farther forward of the fan outlet guide vane 162. The ducted fan 184 may be driven by the low pressure turbine 134 (e.g., coupled to the LP shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flow path or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The stationary struts 174 may each be aerodynamically contoured to direct air flowing thereby. In some examples, other struts are provided in addition to the stationary struts 174 to connect and support the fan cowl 170 and/or core cowl 122. In many examples, the fan duct 172 and the core cowl 122 may at least partially co-extend (generally axially) on opposite sides (e.g., opposite radial sides) of the core cowl 122. For example, the fan duct 172 and the core cowl 122 may each extend directly from the leading edge 144 of the core cowl 122 and may partially co-extend generally axially on opposite radial sides of the core cowl 122.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan outlet guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 3:
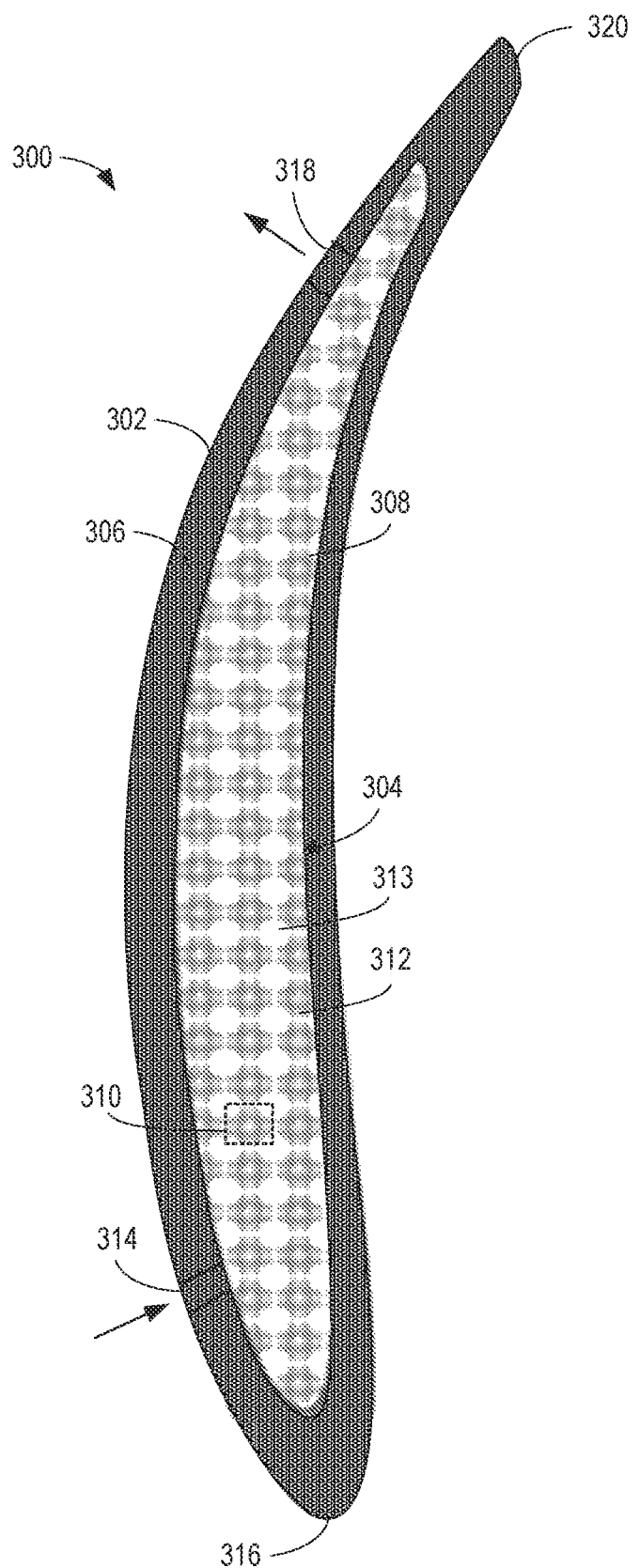
FIG. 3 is a cross-sectional view of the example outlet guide vane of FIG. 1 taken along line A-A of FIG. 1, where the example outlet guide includes an example lattice damper.

FIG. 3 is a cross-sectional view of an example outlet guide vane (e.g., an airfoil, a hollow airfoil, etc.) 300. In the illustrated example of FIG. 3, the outlet guide vane 300 refers to one of the outlet guide vanes or struts 46 of FIG. 1, where the cross-sectional view is taken along line A-A of FIG. 1. In other examples, the outlet guide vane 300 refers to one of the fan outlet guide vanes 162 of FIG. 2, where the cross-sectional view is taken along line B-B of FIG. 2. In the illustrated example of FIG. 3, the outlet guide vane 300 includes an example shell 302 defining an exterior surface of the outlet guide vane 300. The shell 302 forms and/or otherwise defines an example cavity 304 therein. In this example, a cross-sectional shape of the cavity 304 is substantially the same as a cross-sectional shape of the shell 302. In other examples, the cross-sectional shape of the cavity 304 may be different, such that a thickness of an example wall 306 of the shell 302 may vary along a perimeter of the shell 302. In some examples, the cavity 304 further extends in a radial direction of the outlet guide vane 300 between the core engine 16 and the nacelle 44 of FIG. 1.

In this example, an example lattice damper 308 is disposed in the cavity 304. The lattice damper 308 includes example unit cells 310 that form a first lattice pattern, where one of the unit cells 310 is referred to in FIG. 3. For example, the unit cells 310 are joined in a three-dimensional lattice pattern such that the unit cells 310 form example channels 312 therebetween. In some examples, the lattice damper 308 is manufactured in the shell 302 via additive manufacturing. In this example, the lattice damper 308 is constructed from a polyether ether ketone (PEEK) material. In other examples, one or more different materials can be used for the lattice damper 308. In some examples, in addition to or instead of the lattice damper 308, an example foam material 313 may be disposed in the cavity 304 to provide damping and/or absorption of loads on the outlet guide vane 300.

In some examples, during operation of the gas turbine engine 10 of FIG. 1, the outlet guide vane 300 directs flow of gas through the fan flow passage 48 of FIG. 1. In such examples, the gas applies bending and/or vibratory loads on the outlet guide vane 300, and such loads may result in damage to and/or failure of the outlet guide vane 300 over time. To reduce and/or otherwise prevent damage to the outlet guide vane 300, the lattice damper 308 elastically deforms during bending of the outlet guide vane 300 to absorb and/or otherwise dissipate a portion of the loads. Furthermore, the lattice damper 308 can return to an undeformed position to maintain structural integrity of the shell 302 and, thus, the outlet guide vane 300.

In the illustrated example of FIG. 3, an example inlet opening 314 extends through the wall 306 of the shell 302 proximate a leading edge 316 of the outlet guide vane 300, and an example outlet opening 318 extends through the wall 306 proximate a trailing edge 320 of the outlet guide vane 300. In other examples, locations of the inlet and outlet openings 314, 318 may be different. For example, while the inlet and outlet openings 314, 318 in this example are positioned on the same cross-section along line A-A of the outlet guide vane 300, in other examples, the inlet opening 314 is positioned proximate the core engine 16 of FIG. 1, and the outlet opening 318 is positioned radially outward from the inlet opening 314 and proximate the nacelle 44. In the illustrated example of FIG. 3, the inlet opening 314 and the outlet opening 318 are in fluid communication via the channels 312.

In some examples, the gas turbine engine 10 of FIG. 1 is implemented in the propulsion system of an aircraft. During flight of the aircraft, the gas turbine engine 10 may be exposed to cold atmospheric conditions that may cause formation of ice on the outlet guide vane 300. The ice may cause damage to and/or reduce functionality of the gas turbine engine 10. In some examples, to reduce and/or prevent formation of ice, high-temperature fluid is provided to the cavity 304 via the inlet opening 314. For example, the high-temperature fluid may be heated air from the core engine 16 and/or a different heat source fluidly coupled to the inlet opening 314. In some examples, the high-temperature fluid circulates throughout the cavity 304 by flowing through the channels 312, then exits the cavity 304 via the outlet opening 318. In some examples, circulation of the high-temperature fluid through the cavity 304 increases a temperature therein, thereby increasing a surface temperature of the shell 302. In some examples, increasing the surface temperature of the shell 302 reduces and/or prevents formation of ice thereupon.

In some examples, multiple ones of the outlet guide vane 300 are spaced around a circumference of the core engine 16. In some examples, some of the outlet guide vanes 300 may be solid (e.g., do not include the cavity 304), include one or more different materials, and/or implement a different lattice pattern of the lattice damper 308 compared to other ones of the outlet guide vanes 300. In some examples, two or more of the outlet guide vanes 300 positioned at a top and bottom of the core engine 16 (e.g., at the 12 o'clock and 6 o'clock positions) experience greater loads during operation of the gas turbine engine 10 compared to the other outlet guide vanes 300 (e.g., at other positions around the core engine 16). As such, the outlet guide vanes 300 positioned at the top and bottom of the core engine 16 may be manufactured from a first material (e.g., titanium) that is stronger compared to a second material (e.g., aluminum) used for the other outlet guide vanes 300. Additionally or alternatively, the outlet guide vanes 300 positioned at the top and bottom of the core engine 16 may be solid, while the other outlet guide vanes 300 include the cavity 304 and the lattice damper 308 disposed therein. In some examples, one or more of the outlet guide vanes 300 may implement the lattice damper 308 having the first lattice pattern shown in FIG. 3, while remaining ones of the outlet guide vanes 300 may implement one or more different lattice patterns for the lattice damper 308. Different example lattice patterns are described below in connection with FIGS. 5 and/or 6.

While the outlet guide vane 300 of the example of FIG. 3 can be implemented in the gas turbine engine 10, the outlet guide vane 300 may also correspond to an airfoil implemented in connection with a gearbox. In some such examples, the airfoil may rotate at a reduced tip speed and/or a broader range of frequencies compared to the airfoil implemented in the gas turbine engine 10. In such examples, the airfoil may experience vibratory loads caused by variability in the frequencies, thus resulting in deflection of the airfoil. In some examples, the lattice damper 308 of FIG. 3 may reduce the deflection of the airfoil compared to a solid airfoil (e.g., not including the cavity 304 and/or the lattice damper 308).

In some examples, the shell 302 implements shell means, the lattice damper 308 implements damping means, the channels 312 implement fluid flow means, the inlet opening 314 implements fluid inlet means, and the outlet opening 318 implements fluid outlet means.

Figure 4A:
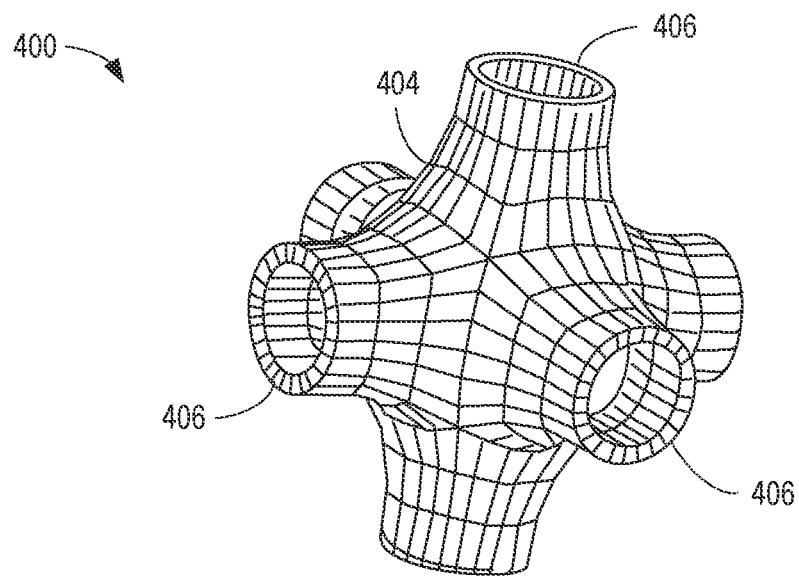
FIG. 4A illustrates a first example unit cell that may be implemented in the example lattice damper of FIG. 3.
Figure 4B:
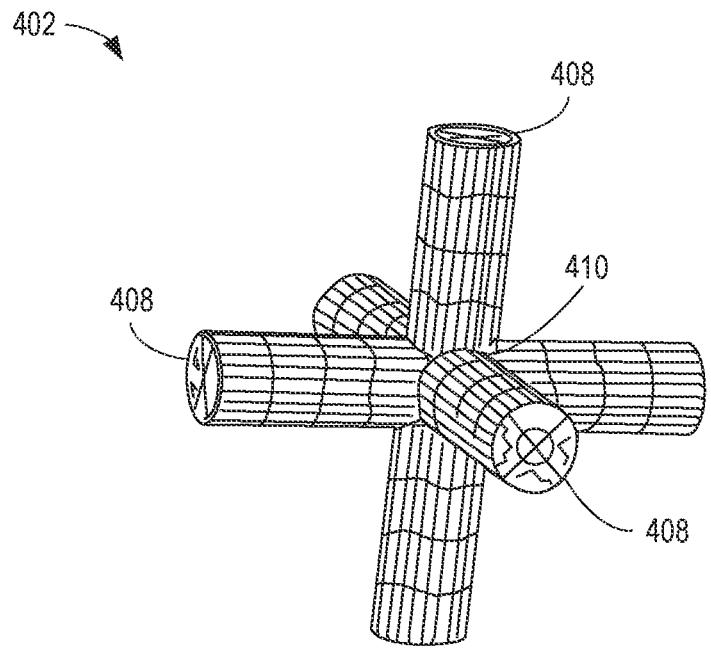
FIG. 4B illustrates a second example unit cell that may be implemented in the example lattice damper of FIG. 3.

FIGS. 4A and 4B illustrate a first example unit cell 400 and a second example unit cell 402, respectively, that may be implemented in the example lattice damper 308 of FIG. 3. In the illustrated example of FIG. 4A, the first unit cell 400 is cross-cube shaped with rounded corners 404 between example tubes (e.g., hollow tubes) 406. In this example, each of the tubes 406 has a generally circular cross-sectional shape and includes a cylindrical aperture extending therethrough. In some examples, multiple ones of the first unit cell 400 can be coupled to one another at ends of the tubes 406 to form the first lattice pattern of the lattice damper 308 of FIG. 3.

Turning the FIG. 4B, the second unit cell 402 is cross-cube shaped and includes example rods (e.g., cylindrical rods) 408 that intersect at an example intersection point 410. In this example, corners between corresponding ones of the rods 408 are not rounded. Furthermore, in contrast to the tubes 406 of FIG. 4A, the cylindrical rods 408 of FIG. 4B are solid (e.g., not hollow). In some examples, the second unit cell 402 can be used instead of the first unit cell 400 of FIG. 4A to form the first lattice pattern of the lattice damper 308 of FIG. 3. In other examples, one or more different unit cells may be used to construct the lattice damper 308 instead.

Figure 5:
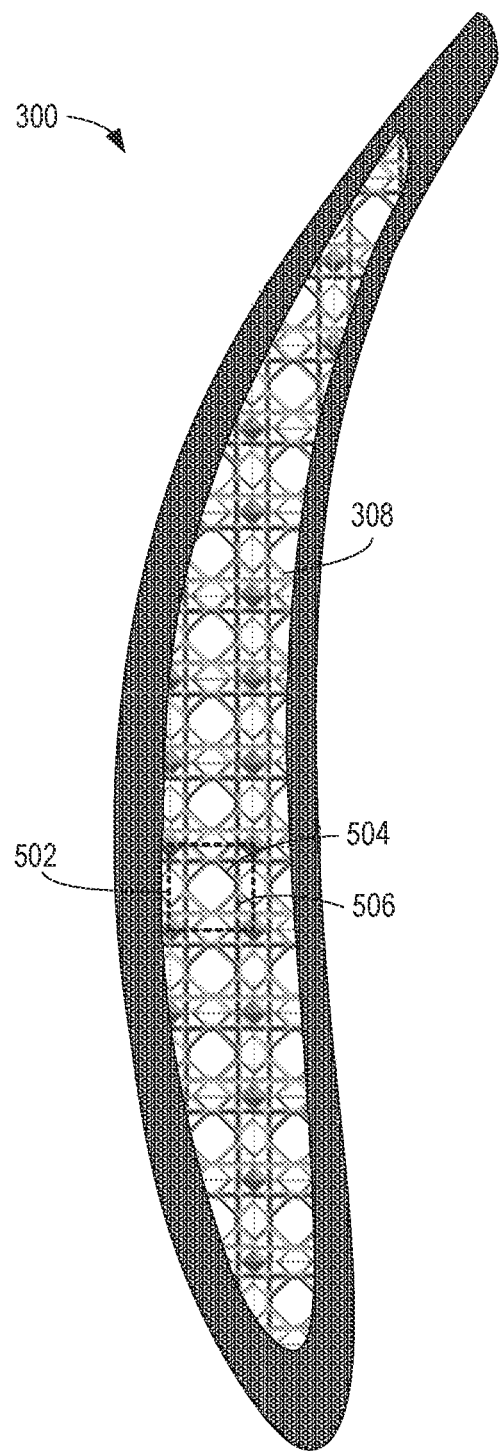
FIG. 5 illustrates the example lattice damper of FIG. 3 implementing a second lattice pattern.

FIG. 5 illustrates the lattice damper 308 of FIG. 3 implementing a second example lattice pattern. In the illustrated example of FIG. 5, a third example unit cell 502 is used instead of the first unit cell 400 of FIG. 4A and/or the second unit cell 402 of FIG. 4B to form the lattice damper 308. In this example, the third unit cell 502 includes example diamond-shaped members 504 inscribed in corresponding rectangular members 506. In this example, a size and/or shape of the diamond-shaped members 504 can vary across the second lattice pattern. In other examples, the size and/or shape of the diamond-shaped members 504 is the same across the second lattice pattern.

Figure 6:
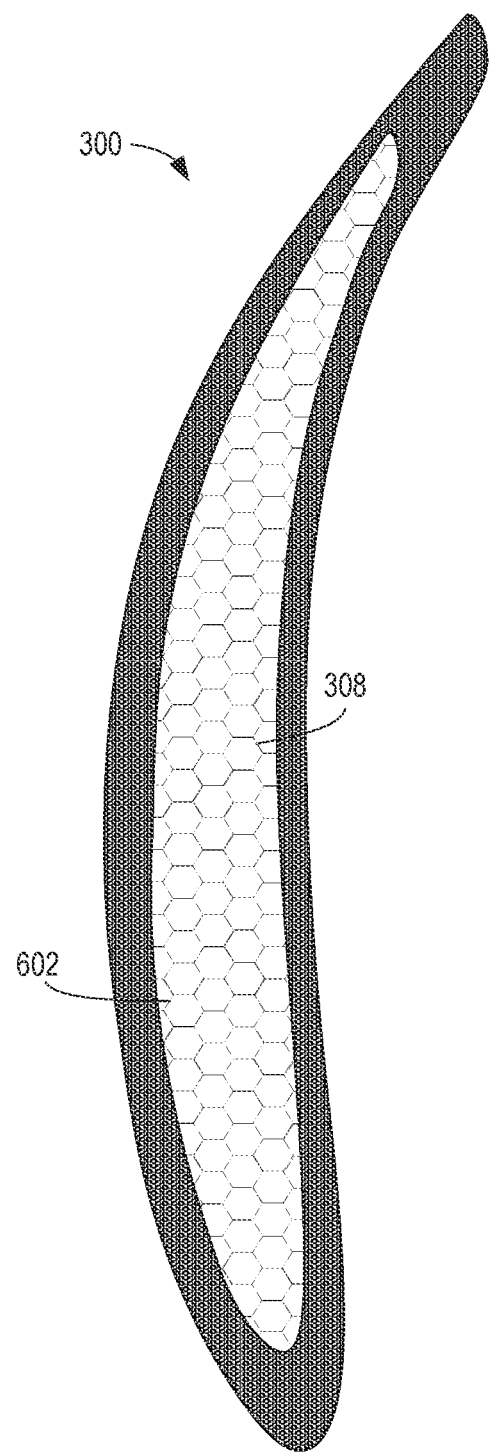
FIG. 6 illustrates the example lattice damper of FIG. 3 implementing a third lattice pattern.

FIG. 6 illustrates the lattice damper 308 of FIG. 3 implementing a fourth example lattice pattern. In the illustrated example of FIG. 6, a fourth example unit cell 602 is used instead of the first unit cell 400 of FIG. 4A, the second unit cell 402 of FIG. 4B, and/or the third unit cell 502 of FIG. 5 to form the lattice damper 308. In this example, the fourth unit cell 602 is hexagonal and/or honeycomb shaped.

Figure 7:
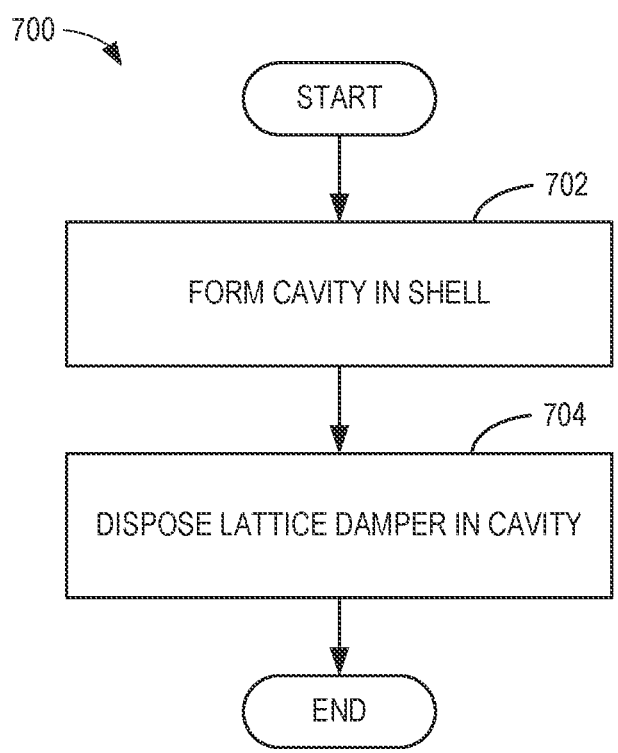
FIG. 7 is a flowchart representative of an example method to produce examples disclosed herein.

FIG. 7 is a flowchart representative of an example method 700 to produce examples disclosed herein. The example method 700 of FIG. 7 may be executed to produce the outlet guide vane 300 of FIG. 3. In the illustrated example of FIG. 7, the method 700 begins at block 702, at which the example cavity 304 is formed in the example shell 302 of FIG. 3, where the shell 302 defines an exterior surface of the outlet guide vane 300. In some examples, the cavity 304 is formed by forming, via additive manufacturing, the shell 302 around the cavity 304. In some examples, the cavity 304 has generally the same shape as a cross-section of the outlet guide vane 300 and extends between the leading and trailing edges 316, 320 of the outlet guide vane 300.

At block 704, the example lattice damper 308 of FIG. 3 is disposed in the cavity 304. For example, the lattice damper 308 is formed using at least one of the first example unit cell 400 of FIG. 4A, the second example unit cell 402 of FIG. 4B, the third example unit cell 502 of FIG. 5, or the fourth example unit cell 602 of FIG. 6. In some examples, the lattice damper 308 is formed using additive manufacturing. In such examples, the lattice damper 308 can be formed using a plastic material (e.g., PEEK). In other examples, one or more different manufacturing processes (e.g., machining, molding) can be used to form the lattice damper 308 instead. In some examples, the lattice damper 308 is formed during additive manufacturing of the shell 302.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that provide damping of an airfoil during operation of a gas turbine engine. The disclosed systems, methods, apparatus, and articles of manufacture reduce and/or prevent failure of the airfoil when exposed to vibratory loads, thus reducing part costs, time, and work required to repair and/or replace the airfoil. Furthermore, examples disclosed herein enable circulation of heated air throughout a cavity of the airfoil, thus reducing and/or preventing formation of ice on the airfoil. The disclosed systems, methods, apparatus, and articles of manufacture are accordingly directed to one or more improvement(s) in the operation of a machine and/or mechanical device.

Further aspects of the present disclosure are provided by the subject matter of the following clauses:

Example 1 includes an airfoil including a shell defining an exterior surface of the airfoil and forming a cavity in an interior surface of the airfoil, and a lattice damper disposed in the cavity, the lattice damper to reduce vibrational loads exerted on the airfoil.

Example 2 includes the airfoil of any preceding clause, wherein a unit cell of the lattice damper is cross-cube shaped.

Example 3 includes the airfoil of any preceding clause, wherein a unit cell of the lattice damper is honeycomb shaped.

Example 4 includes airfoil of any preceding clause, wherein the lattice damper includes a foam material.

Example 5 includes the airfoil of any preceding clause, further including a plurality of channels defined in the lattice damper.

Example 6 includes the airfoil of any preceding clause, further including an inlet opening and an outlet opening extending through a wall of the shell, the inlet opening and outlet opening fluidly coupled via the plurality of channels.

Example 7 includes the airfoil of any preceding clause, wherein the inlet opening is fluidly coupled to a high-temperature region, the inlet opening to receive heated fluid from the high-temperature region, the heated fluid to flow from the inlet opening to the outlet opening via the plurality of channels.

Example 8 includes a gas turbine comprising a core cowl, a fan cowl circumscribing the core cowl, and an outlet guide vane coupled between the core cowl and the fan cowl, the outlet guide vane including a shell defining an exterior surface of the outlet guide vane and forming a cavity in an interior surface of the outlet guide vane, and a lattice damper disposed in the cavity, the lattice damper to reduce vibrational loads exerted on the outlet guide vane.

Example 9 includes the gas turbine of any preceding clause, wherein a unit cell of the lattice damper is cross-cube shaped.

Example 10 includes the gas turbine of any preceding clause, wherein a unit cell of the lattice damper is honeycomb shaped.

Example 11 includes the gas turbine of any preceding clause, wherein the lattice damper includes a foam material.

Example 12 includes the gas turbine of any preceding clause, further including a plurality of channels defined in the lattice damper.

Example 13 includes the gas turbine of any preceding clause, further including an inlet opening and an outlet opening extending through a wall of the shell, the inlet opening and the outlet opening fluidly coupled via the plurality of channels.

Example 14 includes the gas turbine of any preceding clause, further including a high-temperature region fluidly coupled to the inlet opening, the inlet opening to receive heated fluid from the high-temperature region, the heated fluid to flow from the inlet opening to the outlet opening via the plurality of channels.

Example 15 includes the gas turbine of any preceding clause, wherein the outlet guide vane is a first outlet guide vane, further including a second outlet guide vane coupled between the core cowl and the fan cowl, the first outlet guide vane positioned at a top of the core cowl, the second outlet guide vane spaced apart from the first outlet guide vane in a circumferential direction of the core cowl.

Example 16 includes the gas turbine of any preceding clause, wherein the first outlet guide vane includes titanium and the second outlet guide vane includes aluminum.

Example 17 includes an apparatus comprising shell means defining an exterior surface of an outlet guide vane and forming a cavity in an interior surface of the outlet guide vane, and damping means disposed in the cavity, the damping means to reduce vibrational loads exerted on the outlet guide vane.

Example 18 includes the apparatus of any preceding clause, wherein a unit cell of the damping means is cross-cube shaped.

Example 19 includes the apparatus of any preceding clause, further including fluid flow means for enabling fluid to flow therethrough, the fluid flow means defined in the damping means.

Example 20 includes the apparatus of any preceding clause, further including fluid inlet means for receiving the fluid and fluid outlet means for expelling the fluid, the fluid inlet means and the fluid outlet means extending through the shell means, the fluid inlet means and the fluid outlet means fluidly coupled via the fluid flow means.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An airfoil comprising:
    a shell defining an exterior surface of the airfoil and forming a cavity in an interior surface of the airfoil;
    a lattice damper disposed in the cavity, the lattice damper to reduce vibrational loads exerted on the airfoil, the lattice damper including a plurality of unit cells, the plurality of unit cells being cross-cube shaped and hollow with a single continuous surface;
    an inlet opening extending through a wall of the shell proximate a leading edge of the airfoil;
    an outlet opening extending through the wall of the shell proximate a trailing edge of the airfoil; and
    a plurality of channels defined in the lattice damper to fluidly couple the inlet opening to the outlet opening, the inlet opening to receive heated fluid to flow from the leading edge to the trailing edge via the plurality of channels.

2. The airfoil of claim 1, wherein the lattice damper includes a foam material.

3. The airfoil of claim 1, wherein the inlet opening is fluidly coupled to a high-temperature region, the inlet opening to receive the heated fluid from the high-temperature region.

4. The airfoil of claim 1, wherein the inlet opening and the outlet opening are positioned at a same cross-section of the airfoil.

5. The airfoil of claim 1, wherein the inlet opening and the outlet opening are positioned at a same radial distance from a core engine.

6. The airfoil of claim 1, wherein the lattice damper includes polyether ether ketone.

7. A gas turbine comprising:
    a core cowl;
    a fan cowl circumscribing the core cowl; and
    a shell defining an exterior surface of the outlet guide vane and forming a cavity in an interior surface of the outlet guide vane;
    a lattice damper disposed in the cavity, the lattice damper to reduce vibrational loads exerted on the outlet guide vane, the lattice damper including a plurality of unit cells, the plurality of unit cells being cross-cube shaped and hollow with a single continuous surface;
    an inlet opening extending through a wall of the shell proximate a leading edge of the outlet guide vane;
    an outlet opening extending through the wall of the shell proximate a trailing edge of the outlet guide vane; and
    a plurality of channels defined in the lattice damper to fluidly couple the inlet opening to the outlet opening, the inlet opening to receive heated fluid to flow from the leading edge to the trailing edge via the plurality of channels.

8. The gas turbine of claim 7, wherein the lattice damper includes a foam material.

9. The gas turbine of claim 7, further including a high-temperature region fluidly coupled to the inlet opening, the inlet opening to receive the heated fluid from the high-temperature region, the heated fluid to flow from the inlet opening to the outlet opening via the plurality of channels.

10. The gas turbine of claim 7, wherein the outlet guide vane is a first outlet guide vane, further including a second outlet guide vane coupled between the core cowl and the fan cowl, the first outlet guide vane positioned at a top of the core cowl, the second outlet guide vane spaced apart from the first outlet guide vane in a circumferential direction of the core cowl.

11. The gas turbine of claim 10, wherein the first outlet guide vane includes titanium and the second outlet guide vane includes aluminum.

12. An apparatus comprising:
    a shell means defining an exterior surface of an outlet guide vane and forming a cavity in an interior surface of the outlet guide vane;

a damping means disposed in the cavity, the damping means to reduce vibrational loads exerted on the outlet guide vane, a fluid inlet means extending through a wall of the shell means proximate a leading edge of the outlet guide vane;

a fluid outlet means extending through the wall of the shell means proximate a trailing edge of the outlet guide vane; and a fluid flow means defined in the damping means to fluidly couple the fluid inlet means to the fluid outlet means, the fluid inlet means to receive heated fluid to flow from the leading edge to the trailing edge via the fluid flow means.

13. The apparatus of claim 12, wherein a unit cell of the damping means is cross-cube shaped.

\* \* \* \* \*